Patented Oct. 22, 1946

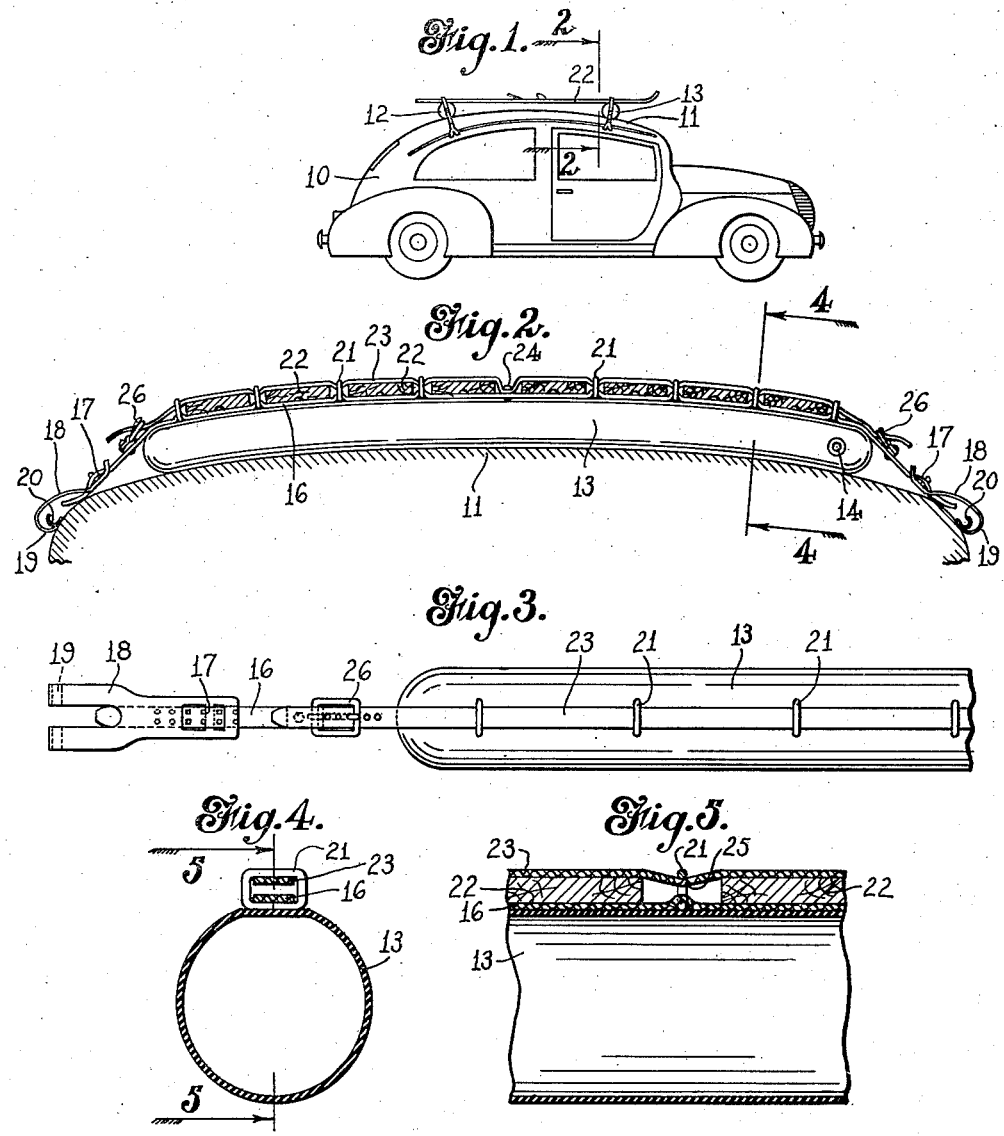

2,409,946

UNITED STATES PATENT OFFICE 2,409,946

LUGGAGE CARRIER

Douglas W. MacLeod, Ansonia, Conn.

Application November 7, 1945, Serial No. 627,223

4 Claims. (Cl. 224—29)

This invention relates to luggage carriers, and more particularly to a luggage carrier for use with automobiles and designed for the carrying of skis or similar articles.

Transportation of relatively long articles, such as skis, fishing rods or the like on automobiles has always presented certain difficulties, and as a result racks or attachments have been designed to be secured to the top of the car and the skis or other articles are secured to these racks. When made a permanent fixture upon the car, these racks are somewhat unsightly, particularly when not being used and, if so constructed as to be removable when their use is not desired, it is usually found that the top of the car has been marred by the racks or that bolt openings or fastening devices remain on the car which interfere with the appearance of the latter. Moreover, many such devices are relatively expensive to make and difficult to attach.

I contemplate in the present invention the provision of a rack or carrier for skis or similar articles which may be readily attached to, or removed from, the top of a car and which will be so constructed that the skis or other articles may be readily secured in place and in a position spaced from the top of the car while, at the same time, the top of the car will not be marred or marked either by the carrier parts or by the skis when secured thereto.

According to the present invention, the ski carrier consists of a pair of inflatable tubes of rubber or rubber-like material which may be secured in spaced position upon the top of a car, these tubes having securing means upon their upper surfaces whereby the skis or similar articles may be secured firmly in place at a position spaced above the car, so that the skis will not come in contact with the top of the car, and the latter will not be marred by the soft rubber or rubber-like material of which the tubes are constructed.

Moreover, when it is desired to remove the luggage carrier from the top of the car, this may be readily done and, when deflated, the tubes may be readily rolled up or folded so as to occupy a minimum amount of space.

One object of the present invention is to provide a new and improved automobile luggage carrier.

A further object of the invention is to provide a new and improved automobile luggage carrier which may be detachably secured upon the top of an automobile without marring the surface of the latter.

A still further object of the invention is to provide a luggage carrier for automobiles particularly adapted for the transportation of skis or like articles, the carrier comprising spaced members which may be readily and detachably secured to the car, these members being inflatable tubes whereby they will, in effect, comprise pad supports for the skis and support the latter without any tendency to rattle, while, at the same time, these supports may be deflated when removed from the car and compactly folded.

To these and other ends the invention consists in the novel features and combinations of parts to be hereinafter described and claimed.

In the accompanying drawing:

Fig. 1 is a side elevational view of my improved luggage carrier mounted upon an automobile;

Fig. 2 is an enlarged sectional view on line 2—2 of Fig. 1;

Fig. 3 is an enlarged top plan view of an end portion of one of the two supports used with the carrier;

Fig. 4 is a sectional view on line 4—4 of Fig. 2; and

Fig. 5 is a fragmentary sectional view on line 5—5 of Fig. 4.

To illustrate a preferred embodiment of my invention, there is shown in Fig. 1 of the drawing an automobile body 10 having a top 11 to which my improved ski carrier is applied.

As illustrated, the carrier comprises a pair of inflatable tubular members 12 and 13, these members being secured to the top 11 in spaced position, and, as shown in Fig. 2, they extend transversely across the top of the car. These tubular members may be made of any desired length, but, as shown, are substantially as long as the width of the car, so that their ends are disposed adjacent the side edges of the car top.

These members, as stated, are hollow and may be made of rubber or rubber-like material, so that they will be airtight and may be inflated with a few pounds of air pressure. For this purpose, each of the supports is provided with a valve 14 for connection with a source of air under pressure.

A strap 16 (Fig. 5) of fabric or the like may be secured by any suitable means to the upper surface of each of the tubular supports, and, if the supports are made of rubber, the strap may be vulcanized or bonded thereto. This strap, as shown in Fig. 2, is longer than the support to which it is secured, so that the end portions thereof may be adjustably secured, as shown at 17, to a buckle or the like at the upper end of a grip member 18, the lower end of which is hook shaped, as shown at 19, to engage below the gutter 20 usually found upon the top of an automobile. While this will be found to be a convenient means for detachably securing the supports in place upon the top of the car, it will be understood that the invention is not limited to such means, but other securing means may be employed if desired.

A plurality of loops or eyes 21 are secured in spaced relation and in upstanding position upon each of the supporting members 12 and 13. These loops may be conveniently secured in place by having the strap 16 passed therethrough and above the lower side thereof, as shown in Figs. 4 and 5, before the strap is secured to the support. These upstanding spaced loops will, as shown in Fig. 2, lie between the skis 22 when the latter are in position upon the carrier and divide each of the supports 12 and 13 into a given number of spaces for the reception of the skis which, as shown in the drawing, will be placed flatly upon the supports between these loop members.

In order to hold the skis securely in place, a second strap member 23 is secured to the strap 16, as shown at 24, substantially midway between the ends of each of the supports, this strap member 23 extending in each direction from the point 24 and adapted, as shown in Fig. 2, to be passed through the loops 21 and above the skis 22, so that the latter will be clamped between the straps 16 and 23 and held securely in place. It will be seen from Fig. 5 that the opening through the loops 21 is of slightly less height than the thickness of the skis, thus causing the upper straps 23 to be bowed or held downwardly at this point, as shown at 25, between two adjacent skis, so that the latter will be prevented from moving laterally and will be held in spaced relation, so that one ski will not come in contact with the adjacent skis on each side.

The ends of the straps 23 are adjustably secured to buckles 26 mounted upon the projecting ends of the strap 16, so that the straps 23 may be drawn up tightly over the skis to hold the latter firmly in place. It will be apparent that with this arrangement the skis will be held above the top of the car and that they will also be held in spaced-apart relation laterally, so that they will be carried without rattling or noise. Moreover, the supports 12 and 13 being formed of rubber or other soft material will not damage the top of the car and, when inflated, will form a suitable support for the skis, while, at the same time, they may be compactly folded or rolled when deflated so as to occupy a relatively small space. At the same time, such supports may be manufactured economically, so that they may be sold at a relatively low price.

As illustrated in the drawing, the supports 12 and 13 are of circular cross section. This shape, however, is not essential to the invention as they may, if desired, be made of oblong shape in cross section, so as to be relatively flat across the top and bottom. As a matter of fact, when the skis are loaded thereon, they will, due to the weight of these objects, probably assume a somewhat flattened shape in any event, depending, of course, upon the degree of inflation employed.

While I have shown and described a preferred embodiment of my invention, it will be understood that it is not to be limited to all of the details shown, but is capable of modification and variation within the spirit of the invention and within the scope of the claims.

What I claim is:

1. In a carrier for skis or like articles, a pair of inflatable elongated tubular members, means for detachably securing said members to the top of a car in spaced relation with the lower surfaces of said members resting on the upper surface of the top, and article-securing means on the upper surfaces of said tubular members, said means comprising a plurality of upstanding elements secured to the upper surfaces of said members in spaced relation.

2. In a carrier for skis or like articles, a pair of inflatable elongated tubular members, means for detachably securing said members to the top of a car in spaced relation with the lower surfaces of said members resting on the upper surface of the top, article-securing means on the upper surfaces of said tubular members, said means comprising a plurality of upstanding elements secured to the upper surfaces of said members in spaced relation, said elements having openings therein, and strap members passing through said openings and secured at their ends to overlie the articles and hold them in place.

3. A carrier for skis or like articles, comprising a pair of inflatable elongated tubular members adapted to be secured to the top of a car in spaced relation, a strap member secured at the upper surface of each of said members, securing means detachably secured to said strap members and adapted to secure the tubular members to the top of a car, a plurality of loop members secured in upstanding spaced relation upon the upper surface of each of said tubular members by said strap members and providing spaces therebetween to receive skis or like articles, and means cooperating with said loop members to secure said articles in place.

4. A carrier for skis or like articles, comprising a pair of inflatable elongated tubular members adapted to be secured to the top of a car in spaced relation, a strap member secured at the upper surface of each of said members, securing means detachably secured to said strap members and adapted to secure the tubular members to the top of a car, a plurality of loop members secured in upstanding spaced relation upon the upper surface of each of said tubular members by said strap members and providing spaces therebetween to receive skis or like articles, means to secure said articles in place, said last-named means comprising strap members secured to said tubular members at their central portions and extending through said loop members, and means detachably securing the ends of said second strap members to said first strap members.

DOUGLAS W. MacLEOD.